United States Patent
Song (10) Patent No.: US 7,555,386 B2
(45) Date of Patent: Jun. 30, 2009

(54) SYSTEM AND METHOD FOR SHARING POSITION INFORMATION USING MOBILE COMMUNICATION SYSTEM

(75) Inventor: Kyeong Sub Song, Icheon-Si (KR)

(73) Assignee: Hyundai Autonet Co., Ltd., Icheon-Shi Kyungki-Do (KR)

(*) Notice: Subject to any disclaimer, the term of this patent is extended or adjusted under 35 U.S.C. 154(b) by 416 days.

(21) Appl. No.: 11/532,471

(22) Filed: Sep. 15, 2006

(65) Prior Publication Data

US 2007/0078595 A1    Apr. 5, 2007

(30) Foreign Application Priority Data

Sep. 23, 2005    (KR) ...................... 10-2005-0088464

(51) Int. Cl.
*G01C 21/30* (2006.01)
(52) U.S. Cl. ................... 701/209; 701/210; 342/357.09
(58) Field of Classification Search ................. 701/209, 701/210; 342/357.09
See application file for complete search history.

(56) References Cited

U.S. PATENT DOCUMENTS 7,446,702 B2 * 11/2008 Huang et al. ........... 342/357.09

2004/0158401 A1 * 8/2004 Yoon .......................... 701/209
2004/0252050 A1    12/2004 Tengler et al.

FOREIGN PATENT DOCUMENTS

| JP | 2004-333510 | 11/2004 |
| KR | 1020040085919 | 10/2004 |
| KR | 1020060016181 | 2/2006 |

* cited by examiner

*Primary Examiner*—Mark Hellner
(74) *Attorney, Agent, or Firm*—IPLA P.A.; James E. Bame (57) ABSTRACT

Provided is a system and method for sharing position information using a mobile communication system. The system includes the mobile communication system providing a short message service; at least one second navigation terminal for detecting the position information from a received position information short message, mapping the detected position information to map data, and transmitting a position information short message; and a first navigation terminal for receiving and storing a proper number of each second navigation terminal, transmitting a position information short message, receiving the position information short message from the navigation terminal, and mapping a position based on the position information to the map data.

4 Claims, 9 Drawing Sheets

SYSTEM AND METHOD FOR SHARING POSITION INFORMATION USING MOBILE COMMUNICATION SYSTEM

CROSS REFERENCE

Applicant claims foreign priority under Paris Convention and 35 U.S.C. § 119 to a Korean Patent Application No. 10-2005-0088464, filed Sep. 23, 2005 with the Korean Intellectual Property Office.

BACKGROUND OF THE INVENTION

1. Field of the Invention

The present invention relates to a navigation system, and more particularly, to a system and method for sharing position information between a plurality of navigation terminals using a mobile communication system, and displaying positions of other navigation terminals, together, in one navigation terminal.

2. Description of the Related Art

In recent years, the number of users of a vehicle equipped with a navigation system providing a road guidance service based on a global positioning system (GPS) is rapidly increasing.

The navigation system includes three or more GPS satellites, a GPS receiver for receiving a position signal and/or an absolute time signal (GPS signal) of each satellite from the three or more GPS satellites, and a navigation terminal having map data inclusive of roads, buildings, mountains, and rivers of a whole country, and calculating a self-position from the received GPS signals, mapping the calculated self-position to the map data, and displaying the mapped self-position.

The navigation system receives a via and a destination from the user, selects a running path from a current position to the destination by a preset path selection method, maps the path to the map data, displays the mapped path, and guides a direction of the navigation terminal running to the destination centering on the path. The path selection method employs a shortest-distance path selection method, an expressway-centered selection method, and a national road-centered selection method.

In general, the navigation terminal of the navigation system is installed in a car, and performs road guidance so that the user can drive the car to the destination fast and conveniently.

As described above, the conventional navigation system is advantageous that, even when the user, that is, a driver does not know a way to the destination, it can display a self-position on a map and perform the road guidance to the destination, thereby providing a convenience.

However, the conventional navigation system displays only the self-position on the map and thus, causes the following drawbacks.

The first drawback is that several persons collectively move riding on the cars not equipped with the navigation terminals or some equipped with the navigation terminals and thus, while they drive to the destination, a preceding vehicle should pay attention to a following vehicle so that the following vehicle does not miss the preceding vehicle, and the following vehicle should pay much attention to the preceding vehicle so that it does not miss the preceding vehicle. Further, the following vehicle is excessively driven not to miss the preceding vehicle and thus, violates a traffic signal.

The second drawback is that, in case where all the cars are equipped with the navigation system, the user should input the destination and set the path to each navigation terminal installed in the car, however, since the paths selected by the respective vehicles can be differentiated at the time of setting the paths, a time taken to arrive at the destination can be differentiated, and since it cannot be recognized that other vehicles run in any area on the path to the destination, it is difficult to do a collective action in driving the car.

SUMMARY OF THE INVENTION

Accordingly, the present invention is directed to a system and method for sharing position information using a mobile communication system that substantially overcomes one or more of the limitations and disadvantages of the conventional art.

One object of the present invention is to provide a system and method for sharing position information between a plurality of navigation terminals using a mobile communication system, and displaying positions of other navigation terminals, together, in one navigation terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a system for sharing position information. The system includes a plurality of navigation terminals for performing a radio communication with a mobile communication system, receiving position information on one or more navigation terminals through the mobile communication system, mapping a self-position and a position based on the received position information to map data, and displaying the mapped self-position and position; and a service providing center for performing a position information sharing authentication between the plurality of navigation terminals, and, upon execution of the position information sharing authentication, receiving the position information from the respective navigation terminals and transmitting the received position information to the corresponding navigation terminals.

In another aspect of the present invention, there is provided a system for sharing position information using a mobile communication system. The system includes a plurality of navigation terminals for performing a radio communication with the mobile communication system, communicating position information on one or more navigation terminals through the mobile communication system, mapping a self-position and a position based on the received position information to map data, and displaying the mapped self-position and position; and a service providing center for performing a position information sharing authentication between the plurality of navigation terminals, and, upon execution of the position information sharing authentication, connecting and controlling the respective navigation terminals to communicate position sharing information.

In a further another aspect of the present invention, there is provided a navigation terminal in a system for sharing position information using a mobile communication system. The system communicates position sharing information including position information and path information between a plurality of navigation terminals, using the mobile communication system, and includes a display unit. The navigation terminal includes a radio communication unit for communicating the position sharing information; a GPS receiver for receiving GPS satellite signals; a map database for storing map data; a position information processor for, under a predetermined control, receiving the GPS satellite signals, calculating a self-position, separating and analyzing the position information and the path information from the received one or more position sharing information, mapping the self-position and a position based on the received position information to the map data, and outputting the mapped self-position and position; and a controller for controlling the position information processor to receive and display the mapped map data on the display unit.

In a yet aspect of the present invention, there is provided a system for sharing position information using a mobile communication system. The system includes the mobile communication system providing a short message service; at least one second navigation terminal for periodically receiving a predetermined position information short message, detecting the position information from the received position information short message, mapping the detected position information to map data, displaying the mapped position information, and transmitting a position information short message comprising self-position information in response to the received position information short message; and a first navigation terminal for, in a position information sharing mode, receiving and storing a proper number of each second navigation terminal, transmitting a position information short message comprising self-position information to the navigation terminals having the proper numbers through the mobile communication system, receiving the position information short message from the navigation terminal in response to the position information short message, mapping a position based on the position information comprised in the received position information short message to the map data, and displaying the mapped position.

In a still aspect of the present invention, there is provided a method for sharing position information using a mobile communication system, in a position information sharing system including at least two navigation terminals for communicating position sharing information and a service providing center for controlling an authentication between the navigation terminals. The method includes steps of, in any first navigation terminal among the navigation terminals, transmitting a position information sharing message including a self-position and proper numbers of second navigation terminals other than the first navigation terminal, to the service providing center through the mobile communication system; in the service providing center, receiving the position information sharing message, detecting the proper numbers of the second navigation terminals, and transmitting the position information sharing message to the second navigation terminals having the proper numbers; in each of the second navigation terminals, receiving the position information sharing message, and, when a position information sharing permission is done by a user, transmitting a position information sharing permission response message to the service providing center, and in the service providing center, upon the receipt of the position information sharing permission response message, connecting between the first navigation terminal and the second navigation terminal, and controlling the first navigation terminal and the second navigation terminal to transmit the position sharing information therebetween.

In a still aspect of the present invention, there is provided a method for sharing position information using a mobile communication system, in a position information sharing system including the mobile communication system and at least two navigation terminals. The method including steps of, in a first navigation terminal among the navigation terminals, when a position information sharing mode is set, receiving and storing proper numbers of other second navigation terminals, periodically generating a position information short message comprising self-position information, and transmitting the generated position information short message to the second navigation terminals; in each of the second navigation terminals, receiving the position information short message, detecting a position based on the position information from the position information short message, mapping the detected position to map data, displaying the mapped position, and transmitting a position information short message comprising a self-position to the first navigation terminal in response to the position information short message received from the first navigation terminal.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numerals will be used throughout the drawings to refer to the same or like parts.

The present invention shares position information between a plurality of navigation terminals connecting with a mobile communication system and permitted each other, and displays not only a self-position but also positions of the plurality of navigation terminals on one map. The navigation terminal connecting with the mobile communication system, that is, the navigation terminal for receiving a GPS signal from GPS satellites and detecting and displaying the self-position, employs a telematics terminal, a mobile phone having a navigation function, and a personal digital assistant (PDA) connecting with the mobile communication system and having the navigation function. A detailed description based on the telematics terminal will be made with reference to the drawings below.

Figure 1:
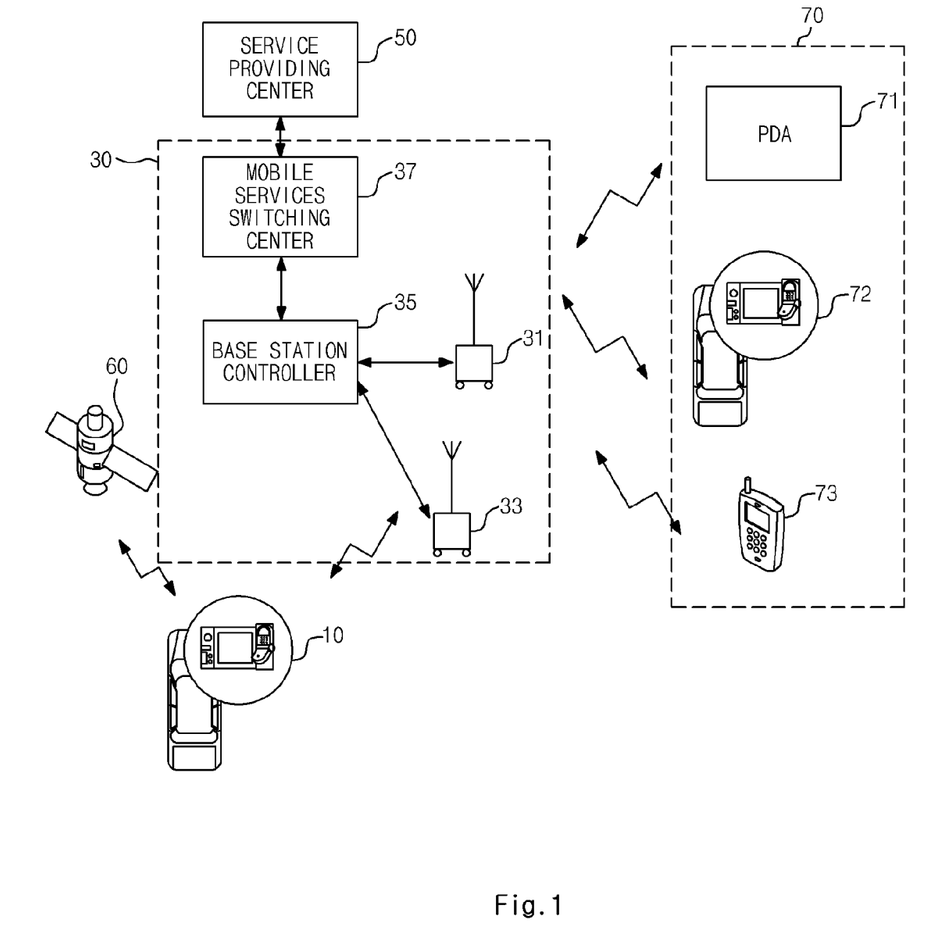
FIG. 1 is a diagram illustrating a construction of a system for sharing position information using a mobile communication system according to the present invention.

FIG. 1 is a diagram illustrating a construction of a system for sharing the position information using the mobile communication system according to the present invention.

Referring to FIG. 1, a reference numeral 10 denotes the telematics terminal, a reference numeral 30 denotes the mobile communication system, and a reference numeral 70 denotes a set of the navigation terminals connecting with the mobile communication system. In FIG. 1, for description convenience, the telematics terminal 10 and the navigation terminal 70 are distinguished and shown to distinguish the navigation terminal sending a request for sharing the position information from the navigation terminal sending a response to the request. Accordingly, the navigation terminal 70 is used as a term including all of a PDA 71, a telematics terminal 72, and a mobile phone 73, which have the navigation function and connect to the mobile communication system 30.

According to the present invention, the position information sharing system includes the mobile communication system 30, a service providing center 50, and the plurality of navigation terminals 70.

The mobile communication system 30 includes a plurality of base stations 31 and 33, a base station controller 35 for controlling the base stations, and a mobile services switching center 37. The mobile communication system 30 provides a voice and data wireless communication between the navigation terminals.

The service providing center 50 provides various additional services, and controls a service authentication and an inter-terminal authentication in providing the additional service. In the present invention, when the telematics terminal 10 sends the request for sharing the position information, the service providing center 50 transmits the request to the navigation terminals 70 desiring to share the position information, and controls only the navigation terminal, which desires to share the position information, among the navigation terminals to share the position information.

Figure 2:
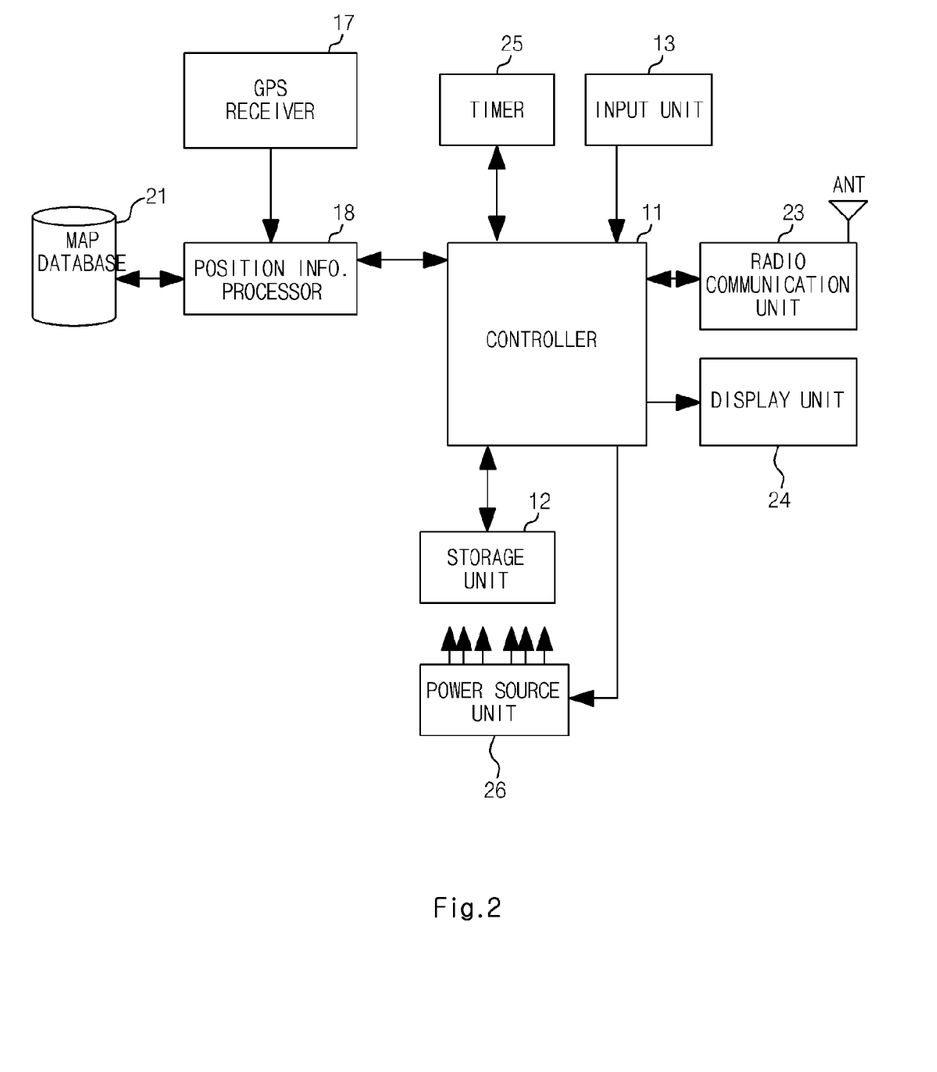
FIG. 2 is a block diagram illustrating a construction of a navigation terminal according to an exemplary embodiment of the present invention.

FIG. 2 is a block diagram illustrating a construction of the navigation terminal according to an exemplary embodiment of the present invention.

Referring to FIG. 2, a controller 11 controls a general operation of the navigation terminal. In particular, the controller 11 controls an operation of sharing the position information with other navigation terminals according to the present invention. A storage unit 12 includes a region for storing a control program for controlling the navigation terminal, a region for temporarily storing data generated in execution of the control program, and a region for storing user data caused by a user. The storage unit 12 stores a self-proper number according to the present invention. The proper number can be either a mobile phone number, or an electronic serial number (ESN).

An input unit 13 generates a command in response to a user's request, and outputs the command to the controller 11. The input unit 13 can be a key input unit, a touch pad, or/and a voice recognition module.

A GPS receiver 17 receives GPS signals from GPS satellites. A map database 21 stores map data including information such as positions, names, and parcel numbers of a mountain, a river, a road, and a building. A position information processor 18 calculates the self-position using the GPS signals received from the GPS receiver 17, maps the calculated position to the map data, that is, to a position on a map corresponding to the calculated position, and outputs the mapped position to the controller 11. In the present invention, the position information processor 18 receives position information of one or more other navigation terminals from the controller 11, maps the self-position together with the position information of the other navigation terminals, and outputs the mapped result to the controller 11.

A display unit 24 receives the map data to which the self-position or/and the position information of the other navigation terminals are mapped, and displays the received map data by graphic, under the control of the controller 11.

A radio communication unit 23 connects with the mobile communication system 30 of FIG. 1 through an antenna (ANT), and communicates with the other navigation terminals.

A timer 25 operates under the control of the controller 11, and counts and provides a variety of times required for an operation of the navigation terminal, to the controller 11.

A power source unit 26 receives a power from the exterior, converts the received power into a power required by each constituent element, and outputs the converted power to each constituent element. In case where the navigation terminal 70 is the telematics terminal 72, the exterior power will be a vehicle battery power of 12V or 24V.

Figure 3:
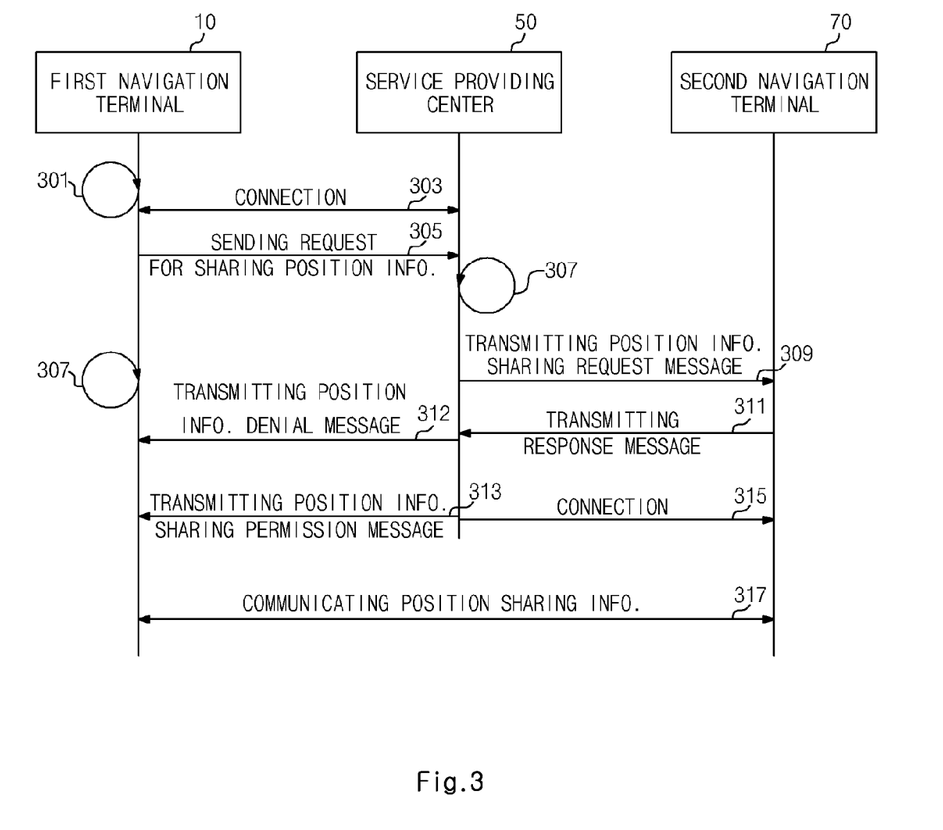
FIG. 3 is a ladder diagram illustrating a method for sharing position information between two navigation terminals according to a first exemplary embodiment of the present invention.

FIG. 3 is a ladder diagram illustrating a method for sharing the position information between two navigation terminals according to a first exemplary embodiment of the present invention. The method for sharing the position information between the two navigation terminals will be described with reference to FIGS. 1 to 3 below. Here, the telematics terminal 10 is called a first navigation terminal, and the navigation terminal 70 is called a second navigation terminal.

In Step 301, the first navigation terminal 10 checks whether or not it receives a position information sharing command and a proper number of a counterpart navigation terminal, that is, the second navigation terminal 70 by the user from the input unit 13 of FIG. 2. Upon the receipt of the position information sharing command and the proper number of the second navigation terminal 70 in the Step 301, the first navigation terminal 10 connects to the service providing center 50 in Step 303. Upon the connection with the service providing center 50, the first navigation terminal 10 generates and transmits a position information sharing request message to the service providing center 50 in Step 305. The position information sharing request message includes aself-proper number, the proper number of the second navigation terminal, and position information sharing request data representing that the position information sharing request message is to request for sharing the position information.

Upon the receipt of the position information sharing request message, in Step 307, the service providing center 50 analyzes the position information sharing request message, and searches the second navigation terminal 70 by the proper number of the second navigation terminal 70. In Step 309, the service providing center 50 transmits the position information sharing request message to the second navigation terminal 70. Alternately, upon the receipt of the position information sharing request message from the first navigation terminal 10, the service providing center 50 determines whether or not the first navigation terminal 10 is a subscribed terminal. Only when it is determined to be the subscribed terminal, the service providing center 50 transmits the position information sharing request message to the second navigation terminal 70. In this case, the user of the first navigation terminal 10 should previously register his/her terminal proper number and user information to the service providing center 50.

Upon the receipt of the position information sharing request message from the service providing center 50, the second navigation terminal 70 informs the user that there is a position information sharing request from the first navigation terminal 10. After that, if the user selects permission or denial, in Step 311, the second navigation terminal 70 transmits a response message including permission information or denial information to the service providing center 50. The service providing center 50 receives and analyzes the response message. If position information sharing is denied, in Step 312, the service providing center 50 transmits a position information sharing denial message to the first navigation terminal 10. If the position information sharing is permitted, the service providing center 50 transmits a position information sharing permission message to the first navigation terminal 10 in Step 313, and connects the first navigation terminal 10 with the second navigation terminal 70 through the mobile communication system 30 so that they can communicate position sharing information with each other in Step 317.

The first and second navigation terminals 10 and 70 directly connecting with each other in the Step 317 communicate their own position sharing information with each other from a moment of connection.

One of the first navigation terminal 10 and the second navigation terminal 70 only transmits the position sharing information, and the other only receives the position sharing information. For example, a navigation terminal of a preceding vehicle does not display a position of a following vehicle, and a navigation terminal of the following vehicle displays a self-position and all positions of the preceding vehicles. This will be useful for a pursuit of a criminal vehicle or a bank transport vehicle. For this, the position information sharing request message should include information indicating that only one party shares the position information. Excepting special circumstances such as the pursuit of the criminal vehicle or the bank transport vehicle, it is desirable not to share the position information until the permission from the navigation terminal displaying only the self-position is obtained.

Figure 4:
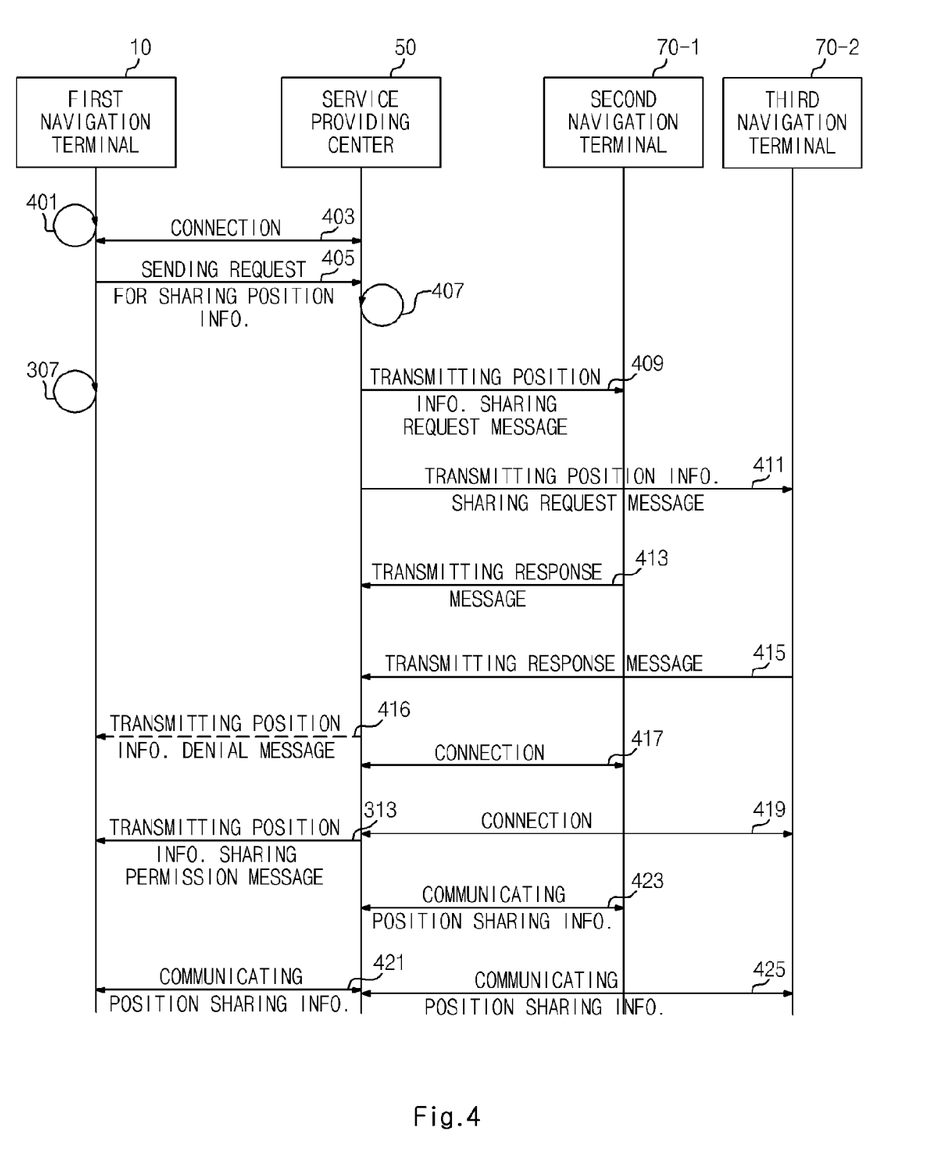
FIG. 4 is a ladder diagram illustrating a method for sharing position information between three or more navigation terminals according to a first exemplary embodiment of the present invention.

A case where three or more navigation terminals are provided will be described with reference to FIG. 4 below. FIG. 4 is a ladder diagram illustrating a method for sharing the position information between three or more navigation terminals according to a first exemplary embodiment of the present invention.

Steps 401 to 407 of FIG. 4 are equal to the Steps 301 to 307 of FIG. 3. However, in FIG. 3, the position information sharing request message is transmitted only to one second navigation terminal 70 while, in Steps 409 to 411 of FIG. 4, a position information sharing request message is transmitted to a second navigation terminal 70-1 and a third navigation terminal 70-2, respectively. Thus, the position information sharing request message transmitted by a first navigation terminal 10 should have proper numbers of both the second navigation terminal 70-1 and the third navigation terminal 70-2. If so, a service providing center 50 can transmit the position information sharing request message to the second navigation terminal 70-1 and the third navigation terminal 70-2.

In FIG. 3, the position sharing information is communicated between the first and second navigation terminals 10 and 20 from the time when there is a mutual permission, that is, a mutual authentication between the first navigation terminal 10 and the second navigation terminal 70. However, in FIG. 4, because the three or more navigation terminals are provided, position sharing information received from the respective terminals should be switched and thus, the position sharing information is communicated between the navigation terminals through the service providing center 50 without a direct communication between the navigation terminals. In other words, upon the receipt of a response message of permitting the sharing of the position information from the respective navigation terminals, the service providing center 50 collects the position sharing information from the respective navigation terminals 10, 70-1, and 70-2, and transmits all position sharing information other than self-position sharing information to the corresponding navigation terminals 10, 70-1, and 70-2. For example, assuming that the position sharing information of the first navigation terminal 10 is defined as first position sharing information, and the position sharing information of the second navigation terminal 70-1 is defined as second position sharing information, and the position sharing information of the third navigation terminal 70-2 is defined as third position sharing information, the service providing center 50 receives the first, second, and third position sharing information from the respective navigation terminals, and transmits the second and third position sharing information to the first navigation terminal 10, the first and third position sharing information to the second navigation terminal 70-1, and the first and second position sharing information to the third navigation terminal 70-2, respectively.

Figure 5:
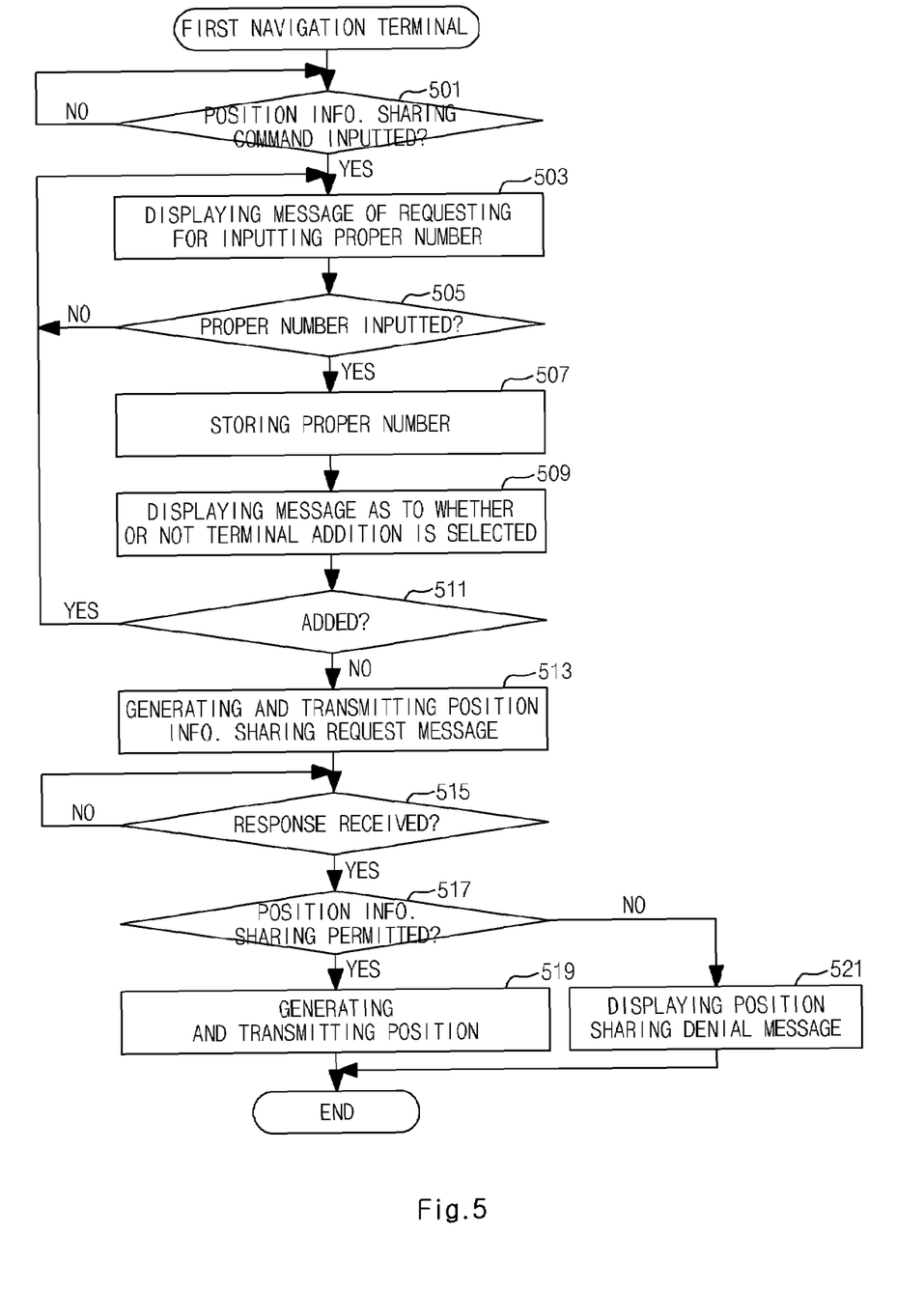
FIG. 5 is a flowchart illustrating a method for sharing position information in a navigation terminal according to a first exemplary embodiment of the present invention.

FIG. 5 being a flowchart illustrating a method for sharing the position information in the navigation terminal according to a first exemplary embodiment of the present invention shows the method for sharing the position information in the navigation terminal sending a request for sharing the position information.

Referring to FIG. 5, the controller 11 checks whether or not it receives a user's position information sharing command from the input unit 13 in Step 501. Upon the receipt of the position information sharing command from the input unit 13, the controller 11 displays a message of requesting for inputting the proper number of the navigation terminal to share the position information, on the display unit 24 in Step 503. After the Step 503, the controller 11 checks whether or not it receives the proper number from the input unit 13 in response to the proper number input request message in Step 505. Upon the receipt of the proper number in the Step 505, the controller 11 stores the proper number in Step 507, and displays a navigation terminal addition selection message of inquiring the user of whether or not it further adds the navigation terminal to share the position information, on the display unit 24 in Step 509, and checks whether or not a navigation terminal addition is selected in Step 511. When it is checked that the addition is selected, the controller 11 returns to the Step 503 and repeatedly performs the Steps 503 to 511 until the navigation terminal addition is not selected in the Step 511. The proper numbers inputted in the Steps 503 to 511 are sequentially stored in the storage unit 12. The number of the added navigation terminals is not limited, but it is desirable to decide the number considering a network data transfer rate.

After the Step 511, in Step 513, the controller 11 generates the position information sharing request message including the self-proper number, one or more proper numbers inputted in the Steps 503 to 511, and the position information sharing data representing that it is a message of requesting for sharing the position information, and transmits the generated position information sharing request message to the mobile communication system 30 through the radio communication unit 23 and the antenna (ANT). The mobile communication system 30 receives and transmits the position information sharing request message to the service providing center 50.

After that, in Step 515, the controller 11 checks whether or not it receives the response message in response to the request message. Upon the receipt of the response message in the Step 515, the controller 11 determines whether the response message is the position information sharing permission message or denial message in Step 517. When the response message is determined to be the position information sharing permission message in the Step 517, the controller 11 controls the position information processor 18 to detect a position and transmit the position sharing information including the detected position information to the mobile communication system 30 through the radio communication unit 23 and the antenna (ANT). However, when the response message is determined to be the position information sharing denial message, the controller 11 displays the position information sharing denial message of informing that a position information sharing request is denied, on the display unit 24 in Step 521.

The position sharing information includes not only the detected self-position information but also path information set by the user.

Together with transmission initiation of the position sharing information, the controller 11 receives position sharing information from the navigation terminals, which send the requests for sharing the position information, through the radio communication unit 23. A process of receiving and processing the position sharing information will be described with reference to FIG. 6 below.

Figure 6:
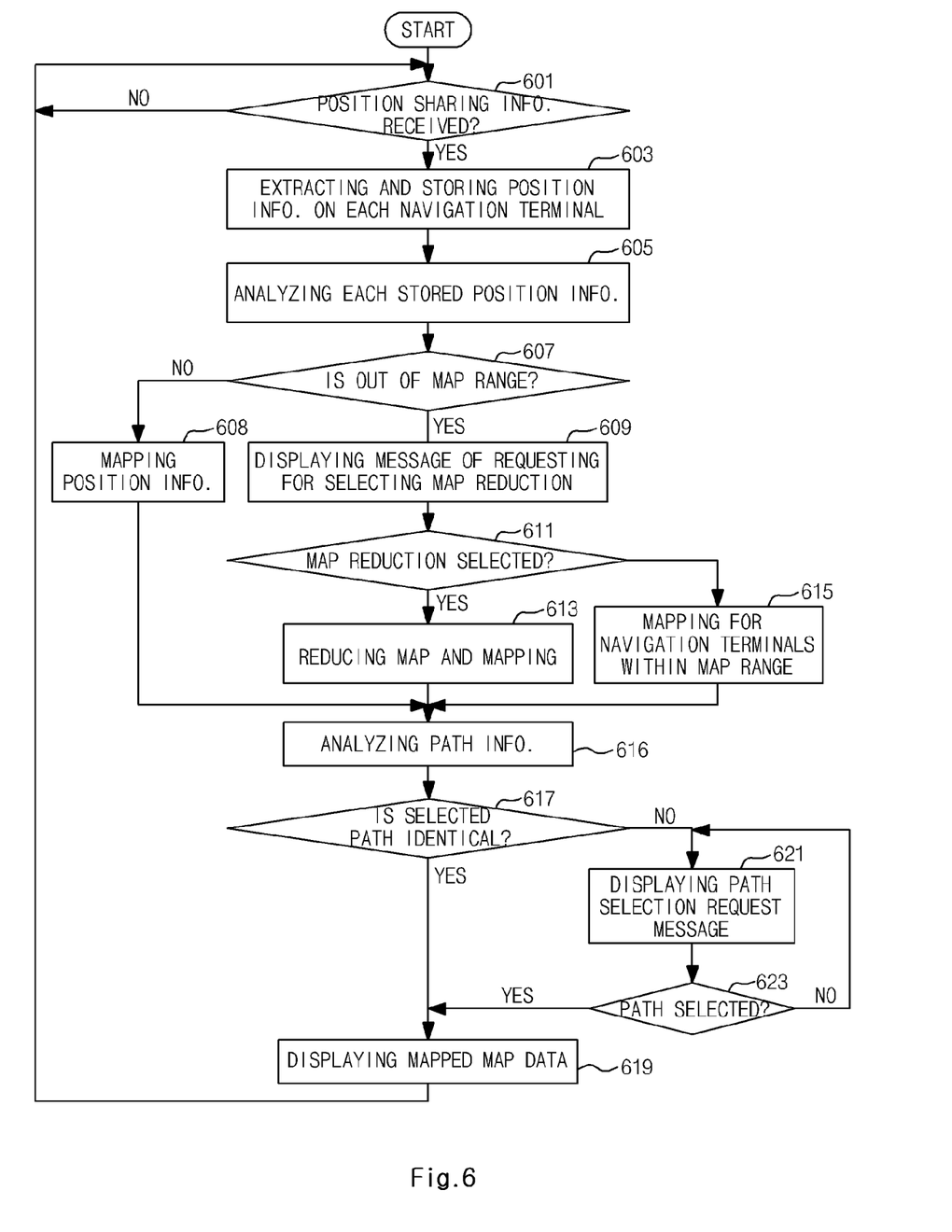
FIG. 6 is a flowchart illustrating a method for displaying positions of a plurality of navigation terminals in a navigation terminal according to a first exemplary embodiment of the present invention.
Figure 7:
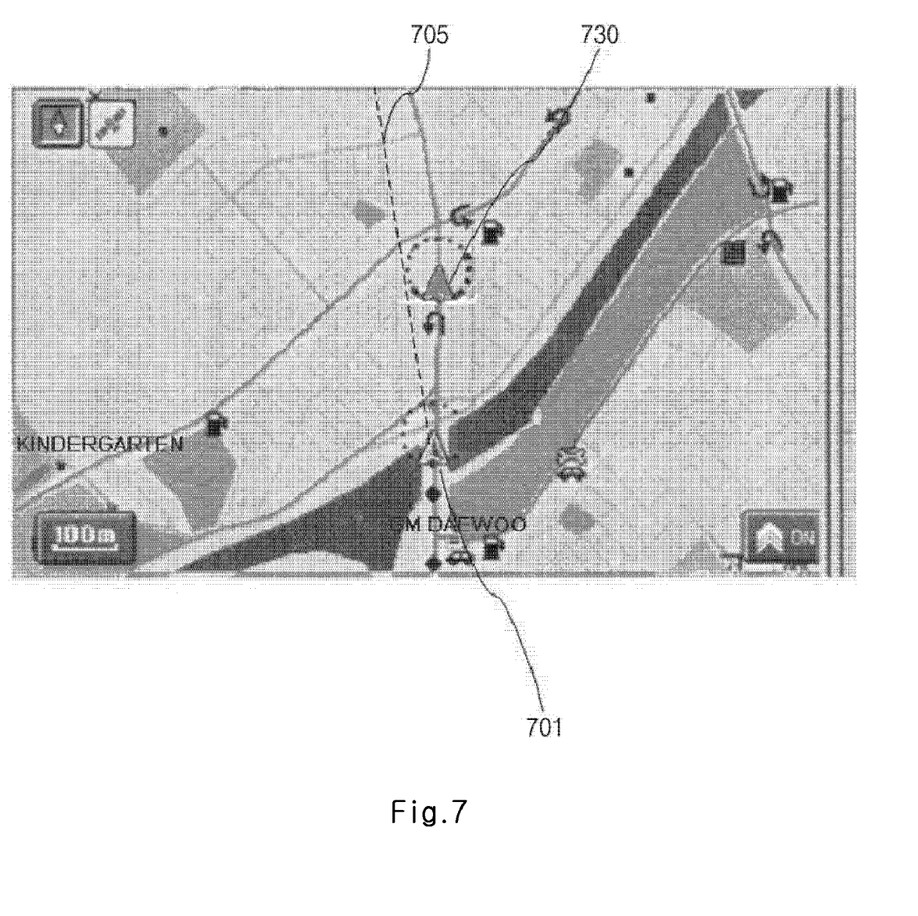
FIG. 7 illustrates an example of displaying positions of a plurality of navigation terminals on a display unit of a navigation terminal, depending on shared position information according to an exemplary embodiment of the present invention.

FIG. 6 is a flowchart illustrating a method for displaying the positions of the plurality of navigation terminals in the navigation terminal according to a first exemplary embodiment of the present invention. FIG. 7 illustrates an example of displaying the positions of the plurality of navigation terminals on the display unit of the navigation terminal, depending on the position sharing information according to an exemplary embodiment of the present invention.

Referring to FIGS. 6 and 7, in Step 601, the controller 11 checks whether or not it receives the position sharing information from other navigation terminals. Upon the receipt of the position sharing information through the radio communication unit 23 in the Step 601, the controller 11 extracts and stores the position information and the path information on each navigation terminal in the storage unit 12 in Step 603. After that, the controller 11 reads and analyzes the stored position information in Step 605, and checks whether or not a position of the position information is within a range of a map currently displayed on the display unit 24 in Step 607. This can be different depending on a magnification scale of the map currently displayed on the display unit 24. When it is checked in the Step 607 that the navigation terminals are all positioned within the map range, Step 608 is performed. When it is checked that any navigation terminal is out of the map range, Step 609 is performed.

In the Step 608, the controller 11 maps the position information to the map, and displays the mapped position information on the display unit 24. In the Step 609, the controller 11 displays a map reduction selection request message on the display unit 24. After the displaying of the map reduction selection request message, the controller 11 checks whether or not a map reduction is selected in Step 611. If the map reduction is selected, Step 613 is performed, and otherwise, Step 615 is performed.

In the Step 613, the controller 11 reduces the map, maps the position information to the reduced map, and displays the mapped position information on the display unit 24. Reducing the map, either the controller 11 can reduce the map on a per-scale basis or the controller 11 can once reduce the map to the extent that a position of the navigation terminal getting out of the map range can be displayed on the display unit 24. In the Step 615, the controller 11 performs mapping only for the navigation terminals within the map range, and displays the mapped result on the display unit 24. Though not shown in the drawings, but the navigation terminal out of the map range can be shown as to whether it is in any direction by showing a dotted line 705 from a navigation terminal 701 showing a self-position to the navigation terminal out of the map range. Further, a distance between the navigation terminal 701 and the navigation terminal out of the map range can be also displayed on the dotted line 705.

FIG. 7 shows a case of sharing the position information with three navigation terminals, and shows the navigation terminal 701 showing the self-position, a navigation terminal 703 within the map range, and the navigation terminal that is out of the map range and thus shows only the direction by the dotted line 705.

After the Step 613 or 615, the controller 11 analyzes the stored path information of the respective navigation terminals in Step 616, and determines whether or not the path information are identical with each other in Step 617. In other words, the controller 11 determines whether or not paths selected by users of the three navigation terminals are identical with each other. When the selected paths are determined to be identical with each other, the controller 11 displays the map to which the path information are mapped, on the display unit 24 in Step 619.

However, when the selected paths of the respective navigation terminals are determined to be different from each other, in Step 621, the controller 11 displays the map to which all of the different paths are mapped, on the display unit 24, and displays a path selection request message of requesting for selecting one among a plurality of the displayed paths on the display unit 24. After that, in Step 623, the controller 11 checks whether or not one path is selected. If the one path is selected in the Step 623, the controller 11 maps the selected path to the map and displays the mapped path in the Step 619. Otherwise, the Step 621 is performed. The path selected by the navigation terminal sending the request for sharing the position information can be set as above. When the position sharing information is transmitted, the selected path is transmitted to other navigation terminals, including the path information and information indicating that the path information is based on the selected path. The other navigation terminals check the information indicating that the path information is based on the selected path, and set their paths by the path of the path information. The path can be also set by a vote method. A vote result is transmitted to all the navigation terminals. The path of the navigation terminal gaining many votes will be selected and set.

The method for sharing the position information through the service providing center 70 is described in the first exemplary embodiment of the present invention. A method for sharing position information using a short message service (SMS) according to a second exemplary embodiment of the present invention will be described with reference to FIGS. 8 and 9 below. The short message service is a service basically provided through a mobile communication system 30 of FIG. 1.

Figure 8:
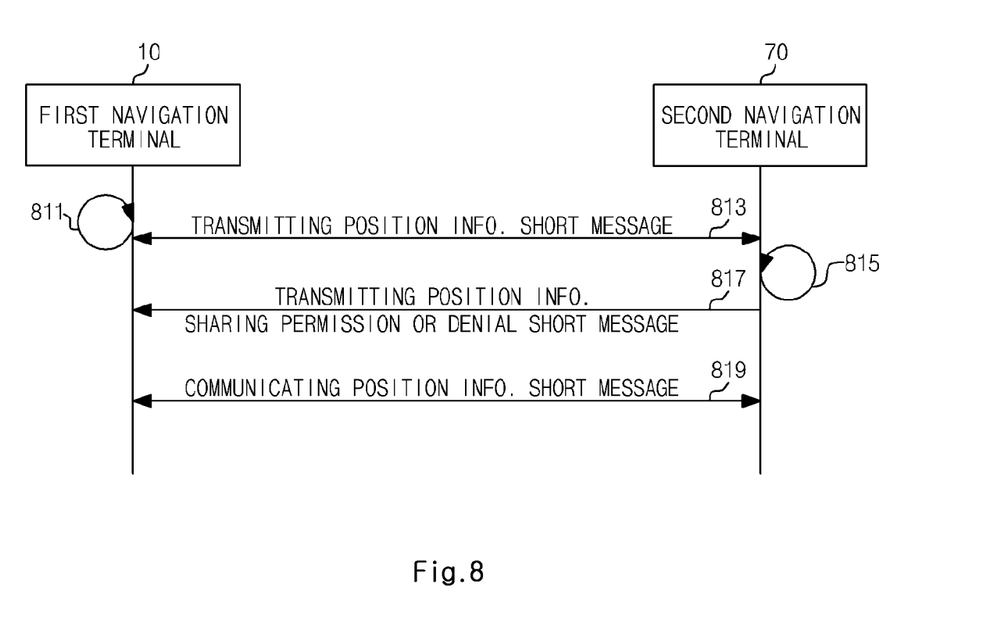
FIG. 8 is a ladder diagram illustrating a method for sharing position information between two navigation terminals according to a second exemplary embodiment of the present invention.

FIG. 8 is a ladder diagram illustrating a method for sharing the position information between two navigation terminals according to the second exemplary embodiment of the present invention.

Referring to FIG. 8, in Step 811, a first navigation terminal 10 receives a position information sharing command and a proper number of a second navigation terminal 70 to share the position information, using an input unit 13 of FIG. 2, and generates a position information short message including the position information measured by a GPS receiver 17.

Upon the generation of the position information short message in the Step 811, the first navigation terminal 10 transmits the position information short message to the second navigation terminal 70 through the mobile communication system 30 in Step 813.

In Step 815, the second navigation terminal 70 checks whether or not it receives the position information short message from the mobile communication system 30. Upon the receipt of the position information short message, the second navigation terminal 70 receives a position information sharing permission or denial from a user, and generates a position information sharing permission or denial short message representing the position information sharing permission or denial.

Upon the generation of the position information sharing permission or denial short message, in Step 817, the second navigation terminal 70 transmits the position information sharing permission or denial short message to the first navigation terminal 10 through the mobile communication system 30.

When the position information sharing permission or denial short message of the Step 817 includes acceptance information, the first navigation terminal 10 and the second navigation terminal 70 communicates position information short messages having their position information with each other in Step 819. The position information short message can be transmitted at a predetermined time interval. The second navigation terminal 70 can transmit self-position information in response to the position information short message received from the first navigation terminal 10.

Figure 9:
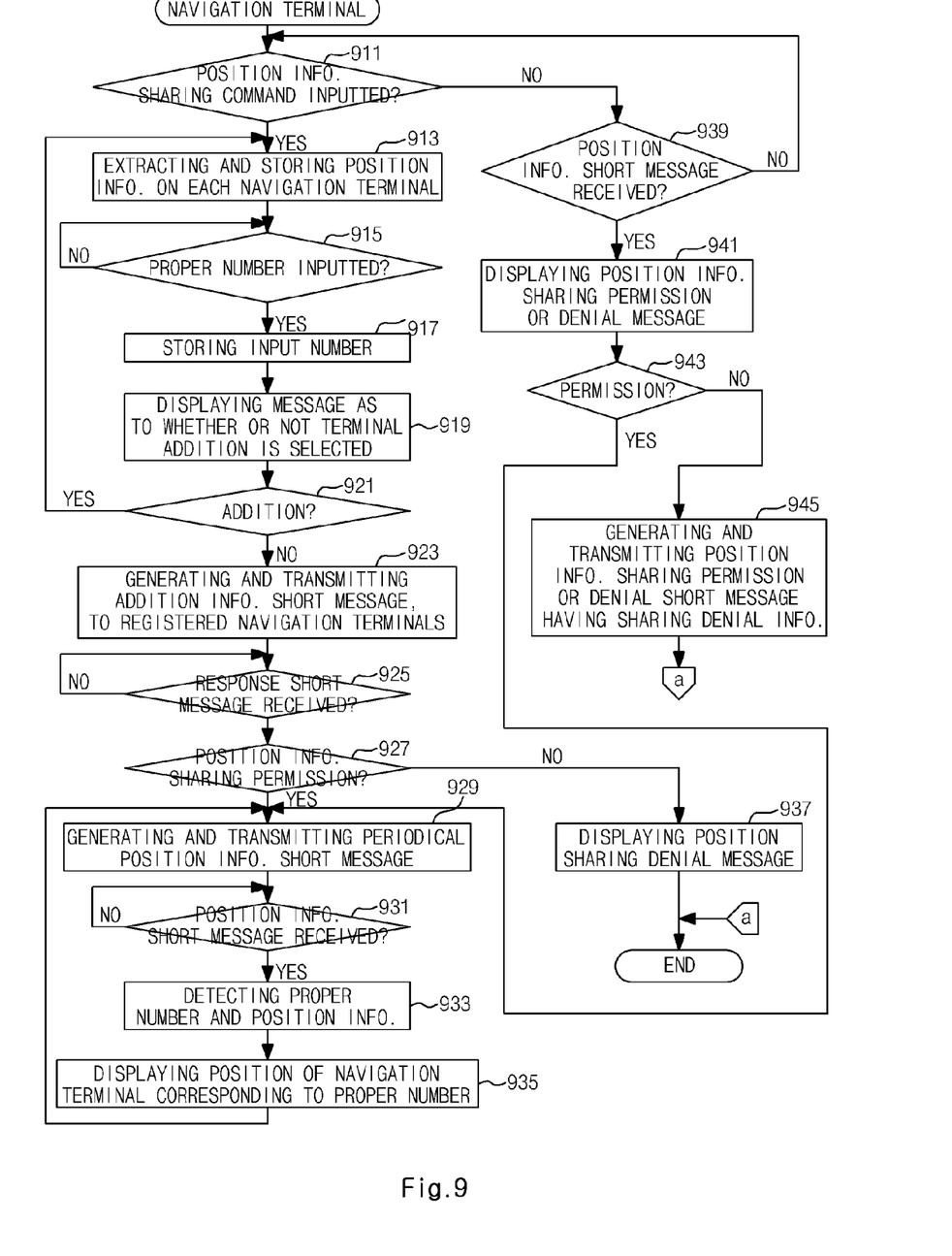
FIG. 9 is a flowchart illustrating a method for sharing position information in a navigation terminal according to a second exemplary embodiment of the present invention.

FIG. 9 is a flowchart illustrating a method for sharing the position information in the navigation terminal according to the second exemplary embodiment of the present invention. A description will be made with reference to FIGS. 1, 2, 8, and 9 below.

Steps 911 to 935 of FIG. 9 are performed in the first navigation terminal 10 sending an initial request for sharing the position information. Steps 939 to 945 and Steps 929 to 935 are performed in the second navigation terminal 70.

In the Step 911, a controller 11 of the first navigation terminal 10 checks whether or not it receives the position information sharing command through the input unit 13. However, even the controller 11 of the first navigation terminal 10 checks together whether or not it receives the position information short message in the Step 939.

Upon the receipt of the position information sharing command, in the Step 913, the controller 11 of the first navigation terminal 10 displays a message of requesting for inputting a proper number of the second navigation terminal 70 to share the position information, on the display unit 24.

After the Step 913, the controller 11 of the first navigation terminal 10 checks whether or not the proper number is inputted in the Step 915. The proper number can employ a phone number of one or more second navigation terminals 70.

Upon the input of the proper number of the second navigation terminal 70 in the Step 915, the controller 11 of the first navigation terminal 10 stores the inputted proper number in the Step 917, and displays a message of inquiring whether or not a position information sharing navigation terminal is added, on the display unit 24 in the Step 919.

After the Step 919, the controller 11 of the first navigation terminal 10 checks whether an addition is selected in Step 921. When the addition is selected, the controller 11 of the first navigation terminal 10 returns to the Step 913 and repeatedly performs the Steps 913 to 921. When a proper number input completion is selected, the Step 923 is performed.

In the Step 923, the controller 11 of the first navigation terminal 10 measures a self-position by the GPS receiver 17 and a position information processor 18, and generates and transmits the position information short message including the measured position information to the second navigation terminal 70 through the radio communication unit 23. The position information short message includes an identifier, which is a combination of special characters and general characters, to distinguish from a general message. For example, the position information short message can be of a type of "??position information?? longitude 128 latitude 100". In the position information short message, "??position information??" is an identifier for indicating that it is a position information short message.

After that, in the Step 925, the controller 11 of the first navigation terminal 10 checks whether or not it receives a response message in response to the transmitted position information short message. The response message can be the position information sharing permission or denial short message of FIG. 8.

Upon the receipt of the position information sharing permission or denial short message that is the response message of the Step 925, the controller 11 of the first navigation terminal 10 analyzes the position information sharing permission or denial short message, and checks whether position information sharing is permitted or denied in the Step 927.

When it is checked to be a position information sharing denial, the controller 11 of the first navigation terminal 10 displays a position information sharing denial message on the display unit 24 in the Step 937, and ends. When it is checked to be a position information sharing permission, the controller 11 of the first navigation terminal 10 generates and transmits the position information short message to the second navigation terminal 70 in the Step 929.

After the Step 929, the controller 11 of the first navigation terminal 10 checks whether or not it receives a position information short message in the Step 931.

Upon the receipt of the position information short message in the Step 931, the controller 11 of the first navigation terminal 10 detects the proper number and the position information from the position information short message in the Step 933. After that, the controller 11 of the first navigation terminal 10 maps a position of the navigation terminal corresponding to the detected proper number to map data, and displays the mapped position in the Step 935. Next, the controller 11 of the first navigation terminal 10 periodically repeats the Step 929 and its subsequent Steps.

A controller 11 of the second navigation terminal 70 checks whether or not it receives the position information sharing command from the input unit 13 in the Step 911, and checks whether or not it receives the position information short message from the radio communication unit 23 in the Step 939.

In the Step 939, the second navigation terminal 70 receives the position information short message that is transmitted by the first navigation terminal 10 in the Step 923.

Upon the receipt of the position information short message, in the Step 941, the controller 11 of the second navigation terminal 70 displays the position information sharing permission or denial message of inquiring whether or not to share the position information, on the display unit 24.

After the Step 941, the controller 11 of the second navigation terminal 70 determines whether either permission or denial is selected in the Step 934.

When it is determined that the denial is selected in the Step 943, in the Step 945, the controller 11 of the second navigation terminal 70 transmits the position information sharing permission or denial short message including position information sharing denial information through the radio communication unit 23, and ends. When it is determined that the permission is selected, in the Step 929, the controller 11 of the second navigation terminal 70 measures a self-position by the GPS receiver 17 and the position information processor 18, and generates and transmits the position information short message including the measured position information through the radio communication unit 23.

After initially transmitting the position information short message, the controller 11 of the second navigation terminal 70 checks whether or not it receives the position information short message from the first navigation terminal 10 in the Step 931.

Upon the receipt of the position information short message in the Step 931, the controller 11 of the second navigation terminal 70 detects the proper number and the position information from the position information short message in the Step 933, and maps the position of the navigation terminal corresponding to the detected proper number to the map data and displays the mapped position on the display unit 24 in the Step 935.

After the Step 935, the second navigation terminal 70 returns to the Step 929 and repeatedly performs the Step 929 and its subsequent Steps.

The above description is made based on only a case where the position information short message has the position information. However, transmission can be performed including information on a speed of the navigation terminal, that is, a speed of a vehicle equipped with the navigation terminal.

As described above, the present invention has an advantage that, when the users move to the same destination by a plurality of vehicles, even positions of vehicles other than a self-vehicle can be displayed, thereby allowing the user to know whether the other vehicles run in any area on the path to the destination and thus, allowing the users to take a collective action even when moving by the plurality of vehicles.

The present invention has an advantage that it can prevent times taken to arrive at the destination from being differentiated with each other because the path is differently selected every vehicle at the time of setting the path.

The present invention is applicable to wanting of a stolen vehicle and the pursuit of the criminal vehicle. Thus, the present invention has an advantage that the stolen vehicle can be found quickly, and a running path of the criminal vehicle can be previously grasped, thereby assisting in a quick arrest.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A system for sharing position information using a mobile communication system, the system comprising:

the mobile communication system providing a short message service (SMS);

at least one second navigation terminal for periodically receiving a predetermined position information short message using the short message service (SMS), detecting the position information from the received position information short message, mapping the detected position information to map data, displaying the mapped position information, and transmitting a position information short message comprising self-position information in response to the received position information short message; and a first navigation terminal for, in a position information sharing mode, receiving and storing a proper number of each second navigation terminal, transmitting a position information short message comprising self-position information to the navigation terminals having the proper numbers through the mobile communication system, receiving the position information short message from the navigation terminal in response to the position information short message, mapping a position based on the position information comprised in the received position information short message to the map data, and displaying the mapped position, wherein the second navigation terminal transmits a position information sharing permission or denial short message representing a position information sharing permission or denial to the first navigation terminal, and the first navigation terminal analyzes the position information sharing permission or denial short message and, only when it is analyzed to be the position information sharing permission, communicates the position information short message and shares the position information directly with the second navigation terminals.

2. The system according to claim 1, wherein, if the position information sharing permission or denial short message comprises a position information sharing denial message, the first navigation terminal displays the position information sharing denial message and informs a user of a position information sharing denial.

3. A method for sharing position information using a mobile communication system, in a position information sharing system comprising the mobile communication system and at least two navigation terminals, the method comprising steps of:

in a first navigation terminal among the navigation terminals, when a position information sharing mode is set, receiving and storing proper numbers of other second navigation terminals, periodically generating a position information short message comprising self-position information, and transmitting the generated position information short message to the second navigation terminals using a short message service (SMS) of the mobile communication system; and in each of the second navigation terminals, receiving the position information short message, detecting a position based on the position information from the position information short message, mapping the detected position to map data, displaying the mapped position, and transmitting a position information short message comprising a self-position to the first navigation terminal in response to the position information short message received from the first navigation terminal, further comprising:

in the second navigation terminal, transmitting a position information sharing permission or denial short message representing a position information sharing permission or denial, to the first navigation terminal; and in the first navigation terminal, analyzing the position information sharing permission or denial short message, and determining the position information sharing permission or denial, whereby only in case where it is determined to be the position information sharing permission, the first navigation terminal and the second navigation terminal communicate the position information short message and share the position information directly therebetween.

4. The method according to claim 3, wherein, if the position information sharing permission or denial short message comprises a position information sharing denial message, the first navigation terminal displays the position information sharing denial message and informs a user of a position information sharing denial.

* * * * *